(12) United States Patent
Haik et al.

(10) Patent No.: US 8,480,992 B2
(45) Date of Patent: Jul. 9, 2013

(54) FILTER AND PROCESS OF USE TO PRODUCE CARBON NANOTUBES FROM AUTOMOTIVE EXHAUSTS

(71) Applicant: United Arab Emirates University, Al Ain (AE)

(72) Inventors: Yousef Haik, Al Ain (AE); Saud Aldajah, Al Ain (AE); Emad Elnajjar, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 13/624,409

(22) Filed: Sep. 21, 2012

(65) Prior Publication Data

US 2013/0022531 A1 Jan. 24, 2013

Related U.S. Application Data

(63) Continuation of application No. 12/496,808, filed on Jul. 2, 2009, now abandoned.

(51) Int. Cl.
*C01B 31/00* (2006.01)

(52) U.S. Cl.
USPC .................. 423/445 B; 977/842; 977/845

(58) Field of Classification Search
USPC ................... 423/445 B; 977/842, 845
See application file for complete search history.

(56) References Cited

PUBLICATIONS

T. Uchida et al., Synthesis of Single-Wall Carbon Nanotubes from Diesel Soot, 45 Jpn. J. Appl. Phys. 8027-8029 (2006).*

* cited by examiner

*Primary Examiner* — Randy Boyer
(74) *Attorney, Agent, or Firm* — Akerman Senterfitt; Michael K. Dixon

(57) ABSTRACT

We disclose a novel filter and process that converts the wastes in automotive exhausts into carbon nanotubes. The filter surface is composed of iron of similar catalyst. The filter is placed along the pathway of exhaust streamlines preferably at an angle of more than 5°. and less than 15°. The filter is heated to temperatures in the range of 200-1000° C. The filter described in this invention can work in its own or supplement existing filtration systems. The end product of this filtration system is a material that is commercially valuable. The synthesized carbon nanotubes are purified using ionic liquid solution that is capable of removing undesirable carbonated material and leaving 95% purified carbon nanotubes. The purified carbon nanotubes have a diameter of 20-50 nm and a length of 1-10 micro meters.

20 Claims, 4 Drawing Sheets

FILTER AND PROCESS OF USE TO PRODUCE CARBON NANOTUBES FROM AUTOMOTIVE EXHAUSTS

CROSS-REFERENCE TO RELATED APPLICATION

This is a continuation patent application of U.S. Utility patent application Ser. No. 12/496,808, filed Jul. 2, 2009, which is incorporated by reference in its entirety.

FIELD OF THE INVENTION

This invention relates to a filter and method that converts automotive exhaust waist to carbon nanotubes.

BACKGROUND OF THE INVENTION

Incomplete combustion, particularly in diesel engines, produces black carbon and many hydrocarbon gases that can contribute to global warming and potential health hazards.

Oxidation catalysts that convert hydrocarbon and carbon monoxide into carbon dioxide and water are known in the literature. Ceramic filters that are known for their efficiency to remove 90% of the particulates require 500° C. and oxygen rich exhaust condition. Filtration systems to capture particulates have been disclosed in prior art, see Nielsen et al. U.S. Pat. No. 5,167,765 and Surgiura et al. U.S. Pat. No. 5,755,963.

Filters that are disclosed in prior art do not teach the conversion of waste from automotive exhaust to commercially viable product such as carbon nanotubes as disclosed in this invention.

SUMMARY OF THE INVENTION

We claim a filter and a process to synthesize carbon nanotubes from automotive engine exhaust waste. In one embodiment the filter is composed of iron plates that are polished prior to placement in the exhaust system. In another embodiment, metallic thin film made out of Fe, Al or Ni is deposited on metallic or nonmetallic layer and placed in the streamline of the exhaust waste. Minor modifications are required to current exhaust systems. The disclosed filter works on its own or in conjunction with other filtration systems. We further claim that the carbon nanotubes formed on the filter surface are recoverable and are utilized for many CNT applications.

DESCRIPTION OF THE INVENTION

Before disclosing embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a filter" includes a mixture of two or more filters, and the like.

The invention describes a filter and a process that converts waist exhaust of automotive engines into carbon nanotubes. The aspects of the invention pertain to the filter material, treatment of the filter material, alignment of the filter material and process that yields the maximum amount of carbon nanotubes.

The filter material is made out of thin (less than 1 mm) thick iron metal, in a preferred embodiment the filter material is made out of pure iron sheets. In another embodiment the metallic filters are made of carbonated steal with low percentage of carbon. In yet another preferred embodiment, a thin layer of iron is posted on any polymeric or metallic sheets. This thin layer is produced by physical process known in the literature such as but not limited to pulse laser deposition or ablation processes.

In the event of using carbonated steel, or iron, a polishing scheme is needed to expose the iron grains on the surface. Such processes may not be needed for thin layer depositions as described before.

The filter material is placed in the path of the exhaust waste of an automotive engine. The filter material is preferably placed at an angle below 45° and most preferably below 15° measured from the streamline of the exhaust waste.

Localized heating of the filter material or its surrounding is required to activate the carbon nanotubes formation. Though a temperature in the range of 700° C. is preferred, temperatures as low as 200° C. showed carbon nanotubes formation. The efficiency of the tube formation is function of the filter angle and the temperature at the filter location.

EXAMPLES

Figure 1:
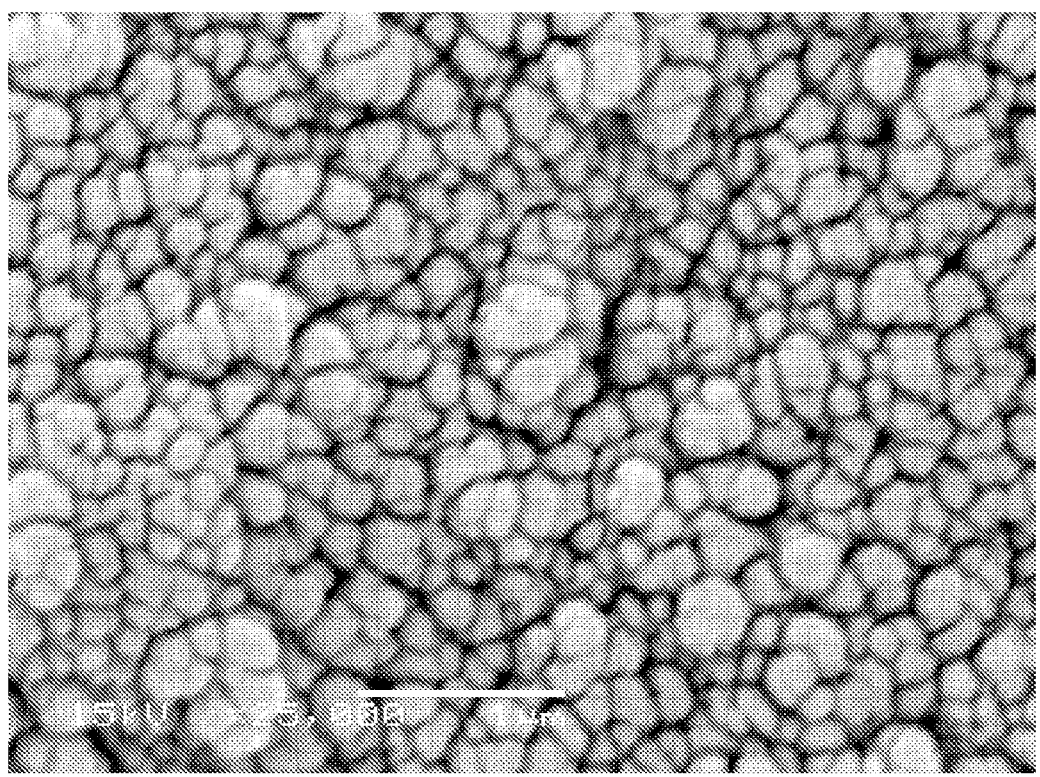
FIG. 1 SEM monograph showing the formation of particulates on a polymeric filter placed in the pathway of exhaust FIG. 2 SEM monograph showing the formation of particulates on the filter material in absence of a localized heating FIG. 3 SEM monograph showing the formation of carbon nanotubes when the filter is placed horizontally along the streamlines of the exhaust waste FIG. 4 SEM monograph showing the formation of carbon nanotubes when the filter is placed at 5° C. from the exhaust streamlines.

The following examples are not to limit the scope of the invention but to illustrate the invention. A filter made out of polymeric structure was placed in the pathway of a diesel engine exhaust. The engine was allowed to run at normal operation condition for half an hour. The filter was recovered and evaluated using SEM. FIG. 1 shows a monograph of the material collected on the polymeric filter. It showed clumps of carbon particulates.

Figure 2:
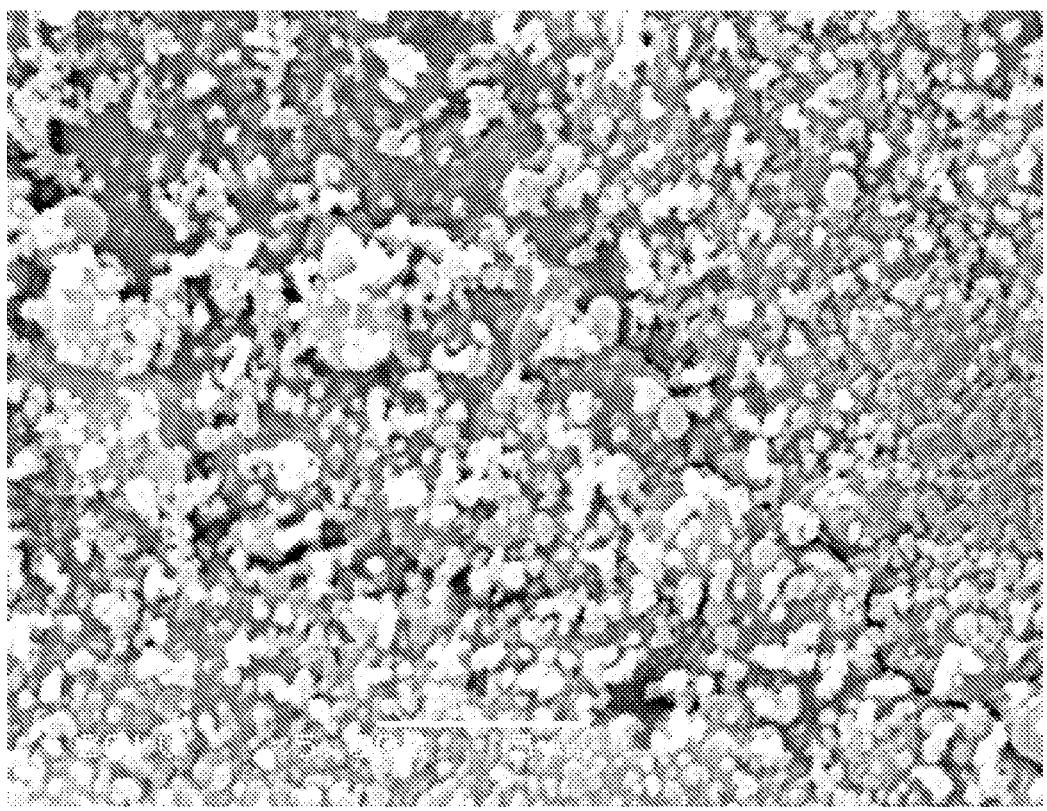

A filter made out of carbonated steel was polished using techniques known in the literature. The surface was examined using optical microscopy. The grains were clearly shown. The filter was placed in the pathway of a diesel engine exhaust. The engine was allowed to run for half an hour under normal operation conditions. The filter was collected and examined using SEM. FIG. 2 shows SEM monograph of the materials collected on the surface of the filter. It shows clumps of carbonated materials.

Figure 3:
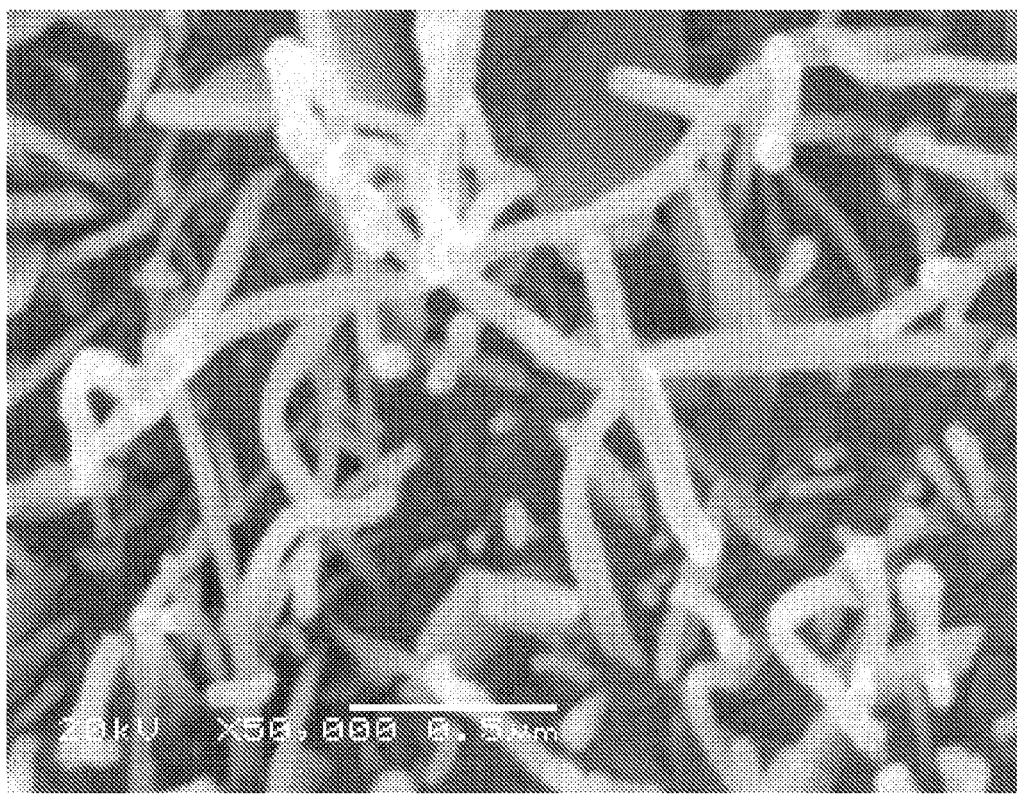

A similar filter made out of carbonated steel was polished and placed in the pathway of the exhaust horizontally to the exhaust streamlines. The filter zone was heated using a gas burner. The diesel engine was allowed to run in normal condition for half an hour. The filter material was collected and examined using SEM. FIG. 3 shows SEM monograph showing the formation of carbon nanotubes.

Figure 4:
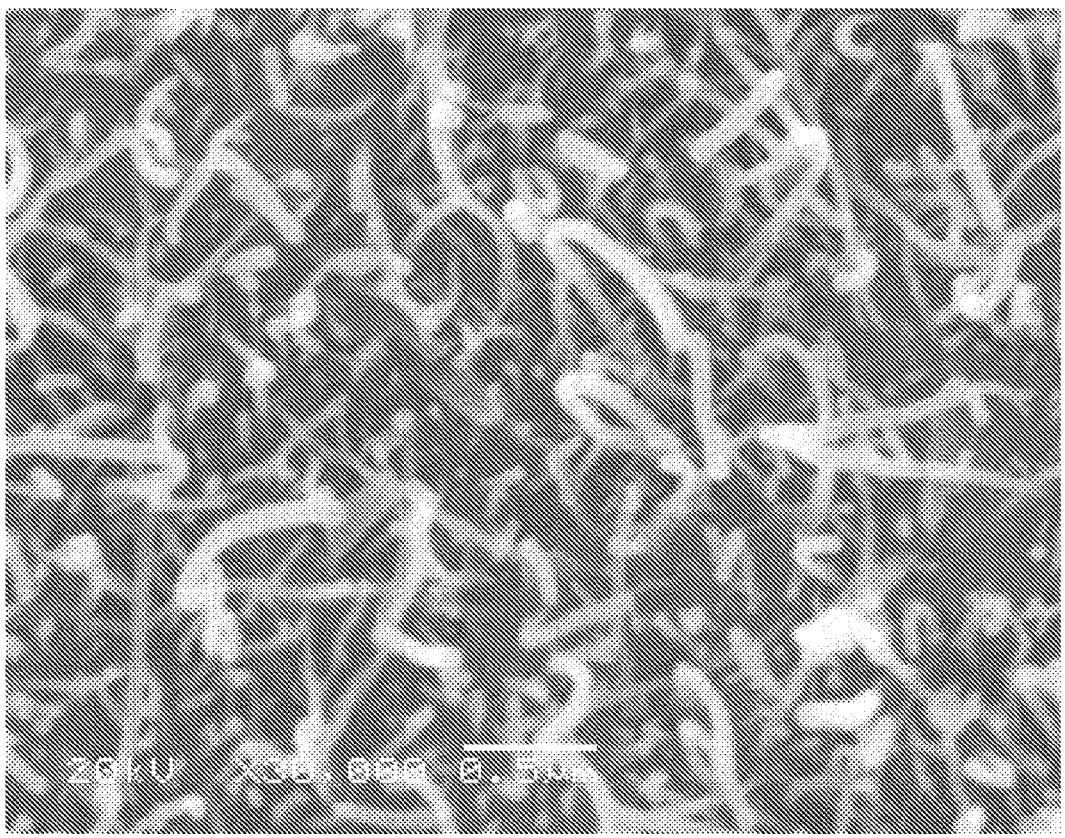

A similar filter made out of carbonated steel was polished and placed in the pathway of the exhaust of a diesel engine at an angle of 5° to the streamlines of the exhaust. A diesel engine was allowed to run under normal operating conditions for half an hour. The filter location was heated using a gas burner. The filter was collected an examined using SEM. FIG. 4 shows a monograph of the filter surface with carbon nanotubes formed on the surface. It is noticeable that the angle of 5° influenced the formation of more carbon nanotubes.

The produced carbon nanotubes are purified by immersing the filter plate in a ionic liquid bath. The purification process using ionic liquids produces 95% purified carbon nanotubes. Without limitation to the composition, ionic liquids have the ability to dissolve carbonated materials other than carbon nanotubes leaving a highly purified carbon nanotube stock.

We claim:

1. A method of converting exhaust waste of automotive engines to carbon nanotubes within an exhaust system in fluid communication with the automotive engine, comprising:
   heating at least one filter to at least 200 degrees Celsius; and
   passing automotive engine exhaust past the at least one filter positioned within the exhaust system of the automotive engine, wherein carbon nanotubes form on an exposed surface of the at least one filter.

2. The method of claim 1, wherein passing automotive engine exhaust past the at least one filter comprises passing automotive exhaust past a surface formed of iron.

3. The method of claim 1, wherein passing automotive engine exhaust past the at least one filter comprises passing automotive exhaust past a surface formed of carbonated steel.

4. The method of claim 1, wherein passing automotive engine exhaust past the at least one filter comprises passing automotive exhaust past a surface formed of a layer formed from a material selected from a group consisting of iron, nickel and aluminum deposited on a surface.

5. The method of claim 1, wherein passing automotive engine exhaust past the at least one filter comprises passing automotive exhaust past the at least one filter having a surface skewed relative to exhaust flow at an angle less than 45°.

6. The method of claim 1, wherein heating the at least one filter to at least 200 degrees Celsius comprises heating the at least one filter to a temperature between 200-700° C.

7. The method of claim 1, wherein passing automotive engine exhaust past the at least one filter comprises passing automotive exhaust past a surface formed from a material selected from a group consisting of Ni, Co or Al.

8. The method of claim 1, wherein passing automotive engine exhaust past the at least one filter positioned within the exhaust system of the automotive engine, wherein carbon nanotubes form on an exposed surface of the at least one filter comprises forming multiwall carbon nanotubes having an average diameter of between 20 and 50 nm and average length of between 1-10 micrometer.

9. The method of claim 1, further comprising purifying the carbon nanotubes using ionic liquid formed from molten salts.

10. The method of claim 1, wherein passing automotive engine exhaust past the at least one filter positioned within the exhaust system of the automotive engine, comprises passing automotive engine exhaust past the at least one filter positioned within the exhaust system of the automotive engine such that carbon nanotubes having a diameter of 20-50 nm and a length of 1-10 micrometers form on an exposed surface of the at least one filter.

11. The method of claim 1, wherein passing automotive engine exhaust past the at least one filter comprises passing automotive exhaust past the at least one filter having a surface skewed relative to exhaust flow an angle between 5° and 15°.

12. A method of converting exhaust waste of automotive engines to carbon nanotubes within an exhaust system in fluid communication with the automotive engine, comprising:
   heating at least one filter to a temperature range between 200 degrees Celsius and 700 degrees Celsius;
   passing automotive engine exhaust past the at least one filter positioned within the exhaust system of the automotive engine filter, wherein the at least one filter has an exposed surface skewed relative to exhaust flow at an angle less than 45°, wherein carbon nanotubes form on the exposed surface of the at least one filter.

13. The method of claim 12, wherein passing automotive engine exhaust past the at least one filter comprises passing automotive exhaust past a surface formed from a material selected from a group consisting of iron and carbonated steel.

14. The method of claim 13, wherein passing automotive engine exhaust past the at least one filter comprises passing automotive exhaust past a surface formed from a material selected from a group consisting of Ni, Co and Al.

15. The method of claim 12, wherein passing automotive engine exhaust past the at least one filter comprises passing automotive exhaust past a surface formed of a layer formed from a material selected from a group consisting of iron, nickel and aluminum deposited on a surface.

16. The method of claim 12, wherein passing automotive engine exhaust past the at least one filter positioned within the exhaust system of the automotive engine, wherein carbon nanotubes form on an exposed surface of the at least one filter comprises forming multiwall carbon nanotubes having an average diameter of between 20 and 50 nm and average length of between 1-10 micrometer.

17. The method of claim 12, further comprising purifying the carbon nanotubes using ionic liquid formed from molten salts.

18. The method of claim 12, wherein passing automotive engine exhaust past the at least one filter positioned within the exhaust system of the automotive engine, comprises passing automotive engine exhaust past the at least one filter positioned within the exhaust system of the automotive engine such that carbon nanotubes having a diameter of 20-50 nm and a length of 1-10 micrometers form on an exposed surface of the at least one filter.

19. The method of claim 12, wherein passing automotive engine exhaust past the at least one filter comprises passing automotive exhaust past the at least one filter having a surface skewed relative to exhaust flow an angle less than 45°.

20. The method of claim 12, wherein passing automotive engine exhaust past the at least one filter comprises passing automotive exhaust past the at least one filter having a surface skewed relative to exhaust flow an angle between 5° and 15°.

* * * * *